United States Patent
Quittner et al.

(10) Patent No.: US 9,440,836 B2
(45) Date of Patent: Sep. 13, 2016

(54) ROTARY CABONATOR

(71) Applicant: The Coca-Cola Company, Atlanta, GA (US)

(72) Inventors: Victor Henry Quittner, Brighton East (AU); William J. Moore, Lilburn, GA (US); Jonathan Kirschner, Powder Springs, GA (US); Ian Stewart Fitzpatrick, Elwood (AU)

(73) Assignee: The Coca-Cola Company, Atlanta, GA (US)

( * ) Notice: Subject to any disclaimer, the term of this patent is extended or adjusted under 35 U.S.C. 154(b) by 193 days.

(21) Appl. No.: 14/200,081

(22) Filed: Mar. 7, 2014

(65) Prior Publication Data

US 2015/0251889 A1  Sep. 10, 2015
US 2016/0152460 A9  Jun. 2, 2016

Related U.S. Application Data

(60) Provisional application No. 61/781,082, filed on Mar. 14, 2013, provisional application No. 61/860,286, filed on Jul. 31, 2013.

(51) Int. Cl.
*B01F 3/04* (2006.01)
*B67D 1/00* (2006.01)
*A23L 2/54* (2006.01)
*F04B 9/02* (2006.01)

(52) U.S. Cl.
CPC ............... *B67D 1/007* (2013.01); *A23L 2/54* (2013.01); *B01F 3/04439* (2013.01); *B01F 3/04808* (2013.01); *B67D 1/0021* (2013.01); *F04B 9/02* (2013.01); *A23V 2002/00* (2013.01); *B01F 2215/0022* (2013.01)

(58) Field of Classification Search
CPC . A23L 2/54; A23V 2002/00; B01F 3/04439; B01F 3/04808; B01F 3/04815; B01F 3/04985; B01F 5/145; B01F 2215/0022; B67D 1/007; B67D 1/0021; F04B 9/02
USPC .................... 261/83, 84, 92, DIG. 7
See application file for complete search history.

(56) References Cited

U.S. PATENT DOCUMENTS

| | | | | |
|---|---|---|---|---|
| 2,319,752 A | * | 5/1943 | Smith | F02B 33/00 123/541 |
| 2,918,009 A | * | 12/1959 | Crevoisier | F02M 43/02 261/84 |
| 3,169,375 A | * | 2/1965 | Velthuis | F01C 1/3442 60/670 |
| 3,900,277 A | * | 8/1975 | Newton | F04C 29/12 418/184 |
| 3,936,246 A | | 2/1976 | Beitzel | |
| 4,109,486 A | * | 8/1978 | Sieck | F01C 11/004 60/648 |
| 4,132,512 A | * | 1/1979 | Roberts | F04C 28/06 418/158 |
| 6,589,033 B1 | * | 7/2003 | Johnson | F01C 11/004 418/13 |
| 6,672,481 B2 | | 1/2004 | Ziesel | |
| 7,823,398 B2 | * | 11/2010 | Glen | F01C 1/3442 62/172 |

(Continued)

*Primary Examiner* — Charles Bushey
(74) *Attorney, Agent, or Firm* — Sutherland Asbill & Brennan LLP

(57) ABSTRACT

The present application provides a rotary carbonator for use with a beverage dispensing system. The rotary carbonator may include an off-center carbonator chamber, a rotor positioned within the off-center carbonator chamber, and a number of vanes extending from the rotor. The vanes may define within the off-center carbonator chamber a first number of vane cavities with an increasing area and a second number of vane cavities with a decreasing area. A water inlet and a gas inlet may be positioned about the first vane cavities and a carbonated water outlet may be positioned about the second vane cavities.

15 Claims, 5 Drawing Sheets

(56) References Cited

U.S. PATENT DOCUMENTS

| | | | |
|---|---|---|---|
| 8,813,499 B2 * | 8/2014 | Melhus | F01C 1/3441 418/260 |
| 2006/0288874 A1 | 12/2006 | Ziesel | |
| 2014/0263446 A1 * | 9/2014 | Quittner | B67D 1/0058 222/129.1 |

* cited by examiner

ROTARY CABONATOR

RELATED APPLICATIONS

The present application claims priority from provisional application Ser. No. 61/781,082, filed on Mar. 14, 2013, and provisional application Ser. No. 61/860,286, filed on Jul. 31, 2013. Ser. Nos. 61/781,082 and 61/860,286 are incorporated herein by reference in full.

TECHNICAL FIELD

The present application and the resultant patent relate generally to beverage dispensers and more particularly relate to beverage dispensers with a rotary carbonator for high quality, on-demand carbonated water with a reduced overall footprint.

BACKGROUND OF THE INVENTION

Beverage dispensers for soft drinks and other types of carbonated beverages generally mix syrups and/or other types of concentrates with carbonated water to produce the beverage. The beverage dispenser therefore may include a carbonator tank to produce and store the carbonated water. Generally described, plain water may be pumped to the carbonator tank so as to mix with a flow of pressurized carbon dioxide gas. The carbonated water may flow to a cold plate and then to a nozzle for mixing with the concentrate or other ingredients. Various types of flow control devices also may be used. The carbonator tank, the related plumbing, and the flow control devices may be relatively expensive and may take up a considerable amount of space within the beverage dispenser.

The typical duty cycle of the beverage dispenser also may have an impact on the quality of the carbonated water produced by the carbonator tank. In a low duty cycle, the carbonated water may sit in the carbonator tank for an extended period of time and may become stale. In a high duty cycle, the water and the carbon dioxide may mix in the carbonator tank for only a short amount of time such that the carbon dioxide may escape upon exiting the nozzle.

There is thus a desire for an improved carbonator for use with beverage dispensers and the like. Preferably such a carbonator may produce a supply of high quality, on demand carbonated water while being smaller and less expensive than known devices.

SUMMARY OF THE INVENTION

The present application and the resultant patent provide a rotary carbonator for use with a beverage dispensing system. The rotary carbonator may include an off-center carbonator chamber, a rotor positioned within the off-center carbonator chamber, and a number of vanes extending from the rotor. The vanes may define within the off-center carbonator chamber a first number of vane cavities with an increasing area and a second number of vane cavities with a decreasing area. A water inlet and a gas inlet may be positioned about the first vane cavities and a carbonated water outlet may be positioned about the second vane cavities. The rotary carbonator thus produces high quality and on demand carbonated water.

The present application and the resultant patent further provide a method of carbonating water on demand. The method may include the steps of rotating a number of sliding vanes in an off-center carbonator chamber such that the sliding vanes define a first number of vane cavities with an increasing area and a second number of vane cavities with a decreasing area, flowing water into the first vane cavities, flowing carbon dioxide into the first vane cavities, mixing the water and the carbon dioxide in the second vane cavities, and then flowing the resultant carbonated water out of the second vane cavities.

The present application and the resultant patent further provide a beverage dispensing system. The beverage dispensing system may include a nozzle, one or more concentrates in communication with the nozzle, and a rotary carbonator for producing a flow of carbonated water in communication with the nozzle.

The present application and the resultant patent further provide a positive displacement pump for use with a flow of water and a flow of carbon dioxide to form a flow of carbonated water. The positive displacement pump may include a water cylinder with a water piston therein to meter a portion of the flow of water, a carbon dioxide cylinder with a carbon dioxide piston therein to meter a portion of the flow of carbon dioxide, a mixing cylinder with a mixing piston therein to mix the flow of water from the water cylinder and the flow of carbon dioxide from the carbon dioxide cylinder to form the flow of carbonated water, and a crankshaft to maneuver the pistons.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
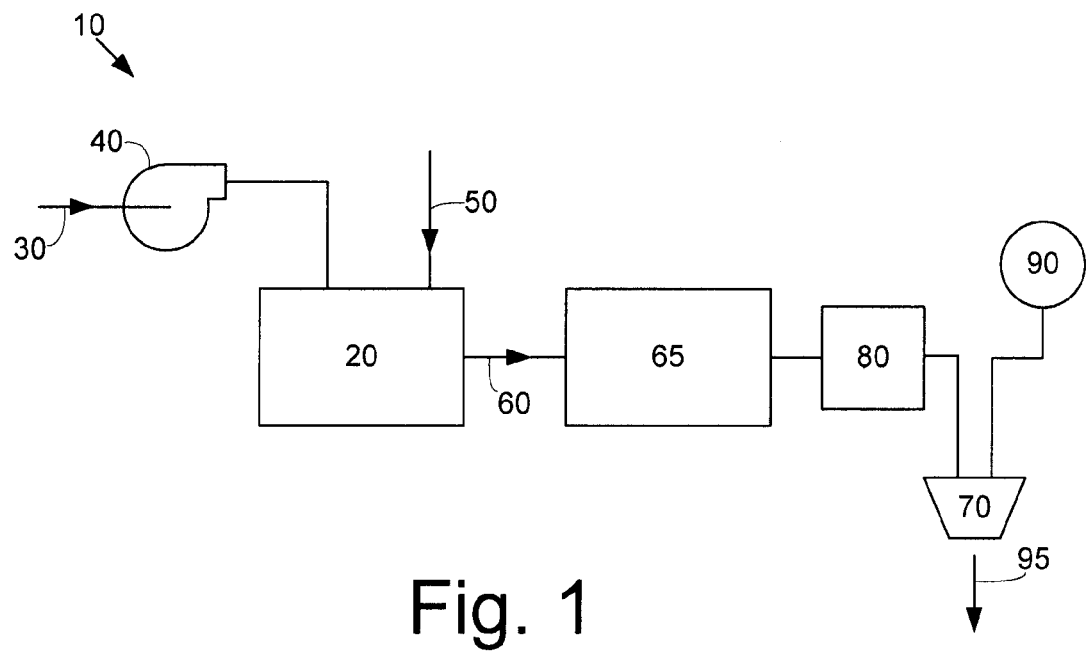
FIG. 1 is a schematic diagram of a known beverage dispensing system with a carbonator tank.

Referring now to the drawings, in which like numerals refer to like elements throughout the several views, FIG. 1 shows a schematic diagram of an example of a known beverage dispensing system 10. Generally described, the beverage dispensing system 10 includes a carbonator tank 20. The carbonator tank 20 may mix a flow of plain water 30 from a pump 40 or otherwise with a pressurized flow of carbon dioxide 50. The carbon dioxide 50 may dissolve within the plain water 30 within the carbonator tank 20 to produce carbonated water 60. The carbonated water 60 may flow through a cold plate or other type of a heat exchanger 65 to a nozzle 70. Various types of flow control devices 80 also may be used herein. The carbonated water 60 may mix with one or more concentrates 90 and/or other ingredients within or about the nozzle 70 to create a beverage 95. The beverage dispensing system 10 described herein is for the purpose of example only. Beverage dispensing systems with many other components and configurations may be used.

Figure 2:
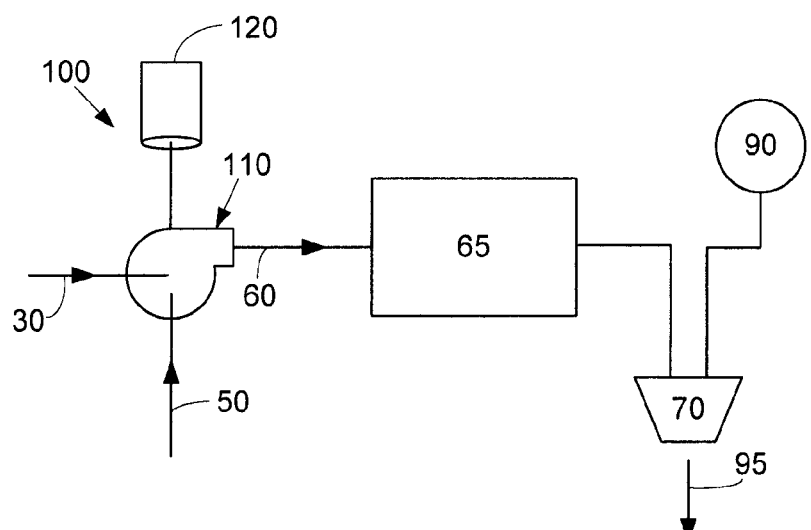
FIG. 2 is a schematic diagram of a beverage dispensing system with a rotary carbonator as may be described herein.

FIG. 2 shows a schematic diagram of a beverage dispensing system 100 as may be described herein. Instead of using the carbonator tank 20, the pump 40, and perhaps the flow control device 80, the beverage dispensing system 100 may use a rotary carbonator 110. The rotary carbonator 110 may be driven by an electrical motor 120 or other type of drive mechanism. The electrical motor 120 may be conventional AC motor and the like. Alternatives also include a brushless DC motor and the like. Such a brushless DC motor may have direct-off-mains controllers for high starting torque. The rotary carbonator 110 mixes the flow of plain water 30 and the pressurized flow of carbon dioxide 50 to form the carbonated water 60. The carbonated water 60 then may pass through the heat exchanger 65 and mix with the concentrates 90 and/or other ingredients at the nozzle 70 to produce the beverage 95. The rotary carbonator 110 also may be incorporated into the nozzle 70 or may be positioned elsewhere in the beverage dispensing system 110.

Figure 3:
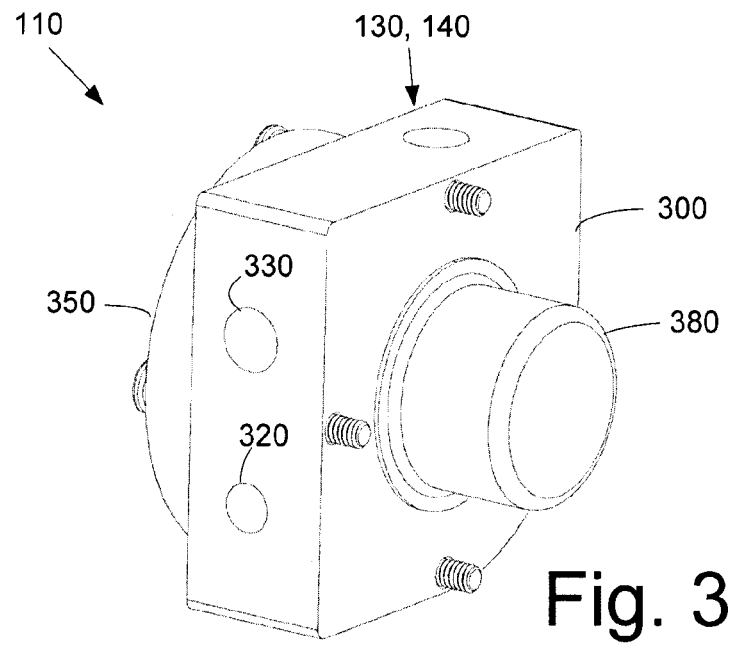
FIG. 3 is a perspective view of the rotary carbonator of FIG. 2.
Figure 5:
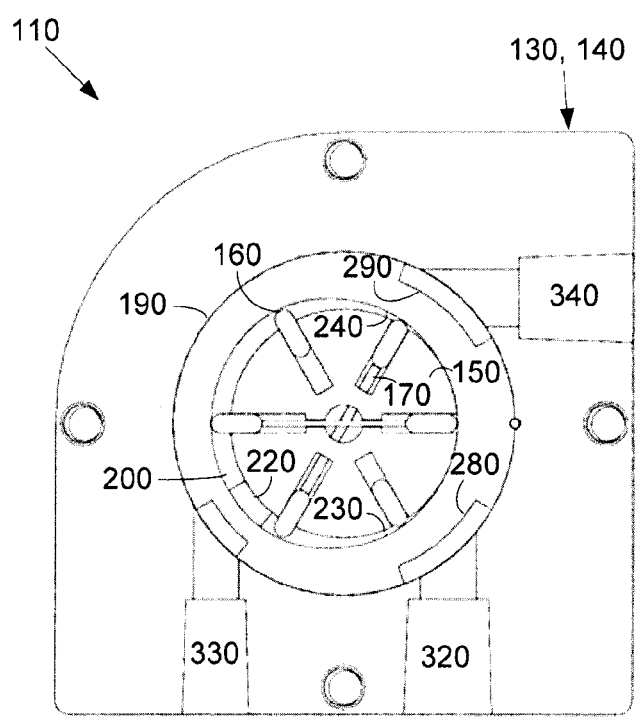
FIG. 5 is a side sectional view of the rotary carbonator of FIG. 2.
Figure 4:
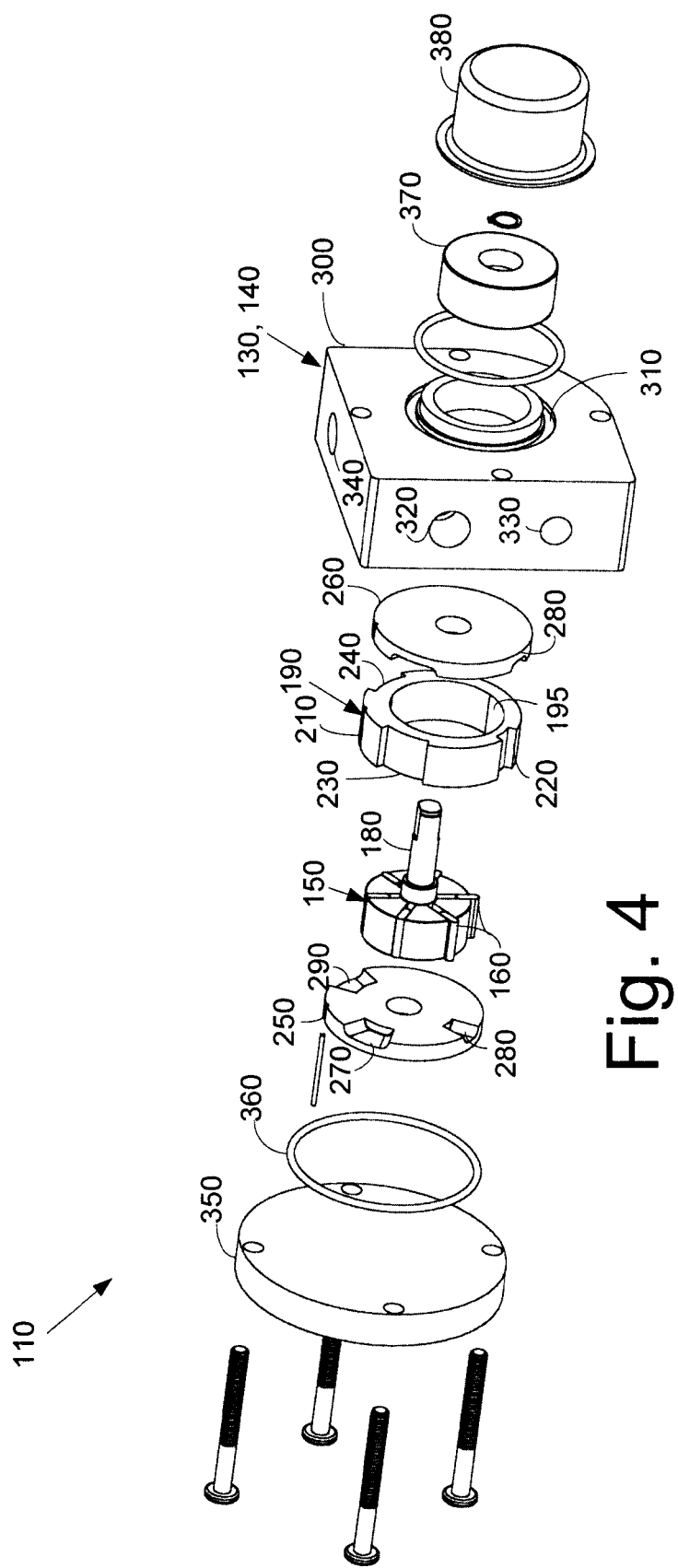
FIG. 4 is an exploded view of the rotary carbonator of FIG. 2.

FIGS. 3-5 show an example of the rotary carbonator 110. The rotary carbonator 110 may be a type of positive displacement pump 130 and the like. More particularly, the positive displacement pump 130 may be a type of rotary vane pump 140. The rotary vane pump 140 may be in communication with the flow of plain water 30 and the flow of carbon dioxide 50 as is described above. The rotary vane pump 140 may have any size, shape, or configuration.

Generally described, the rotary carbonator 110 may include a circular rotor 150. The circular rotor 150 may have a number of sliding vanes 160 positioned therein. Each pair of opposed vanes 160 may be connected via a spring 170 or other type of linkage. Alternatively, each vane 160 may have an independent spring 170. Any number of the vanes 160 may be used herein. Although the vanes 160 are shown as being straight or radial from the rotor 150, the vanes 160 also may have a leading angle. Such a leading angle may assist in adding a component of sealing force via the rotational force. Any angle may be used herein The rotor 150 also may include a drive shaft 180 extending therefrom in communication with the electrical motor 120 or other type of drive mechanism.

The rotary vane pump 140 may also include a stator 190 such that the rotor 150 may rotate within the stator 190. The rotor 150 and the stator 190 may have any size, shape, or configuration. In operation, the sliding vanes 160 may be forced in an outward radial direction against an interior 195 of the stator 190 via centrifugal force. Further, the springs 170 may be utilized in forming a tight seal between the sliding vanes 160 and the stator 190. Good sealing therein may assist in creating the carbonated water 60. The springs 170 also may assist during startup and shutdown when the centrifugal forces may be reduced.

The rotor 150 and the stator 190 may define an off-center carbonator chamber 200 therebetween so as to mix the flows of water 30 and gas 50 to produce the carbonated water 60. The stator 190 and the off-center carbonator chamber 200 may have varying radii of curvature therein. Specifically, the interior surface 195 of the stator 190 may define the varying radii of curvature. The stator 190 also may have an exterior surface 210. The exterior surface 210 may define a stator water pathway 220, a stator gas pathway 230, and a stator carbonated water 240 formed therein. The off-center carbonator chamber 200 may be enclosed by a rear chamber plate 250 and a front chamber plate 260. The chamber plates 250, 260 both may have a plate water pathway 270 that aligns with the stator water pathway 220, a plate gas pathway 280 that aligns with the stator gas pathway 230, and a carbonated water pathway 290 that aligns with the stator carbonated water pathway 240. Other components and other configurations may be used herein.

The rotor 150 and the stator 190 may be positioned within a pump housing 300. The pump housing 300 may include a housing aperture 310 extending therethrough and sized for the stator 190. The pump housing 300 may include a housing water pathway 320 that aligns with the stator water pathway 220 and the plate water pathways 270 to form a water inlet 325, a housing gas pathway 330 that aligns with the stator gas pathway 230 and the plate gas pathways 280 to form a gas inlet 335, and a housing carbonated water pathway 340 that aligns with the stator carbonated water pathway 240 and the plate carbonated pathways 290 to form a carbonated water outlet 345. The pump housing 300 may have any size, shape, or configuration. The pump housing 300 may be enclosed by a housing plate 350 and a seal 360 via a number of fasteners. The seal 360 may be a conventional O-ring seal and the like. The pump housing 300 may have any size, shape, or configuration.

As described above, the rotary vane pump 140 may be driven by the motor 120. The connection with the motor 120 may be magnetic. Specifically, the drive shaft 180 of the rotor 150 may align with a magnetic coupling 370. The magnetic coupling 370 may be enclosed by a cap 380 and driven by the motor 120. Other types of drive mechanisms may be used herein. For example, the magnetic coupling 370 may be part of the electrical motor 120 itself when using the brushless DC motor and the like.

The vanes 160 may be made from a graphite material and the like. The graphite material may be substantially self-lubricating with a low wear rate. The rotor 150, the stator 190, and the related components may be made from a stainless steel or a thermoplastic with good mechanical and thermal properties such as PEEK (polyetheretherketone). Other types of materials may be used herein. The components may be machined or molded in a conventional manner or produced by three-dimensional printing techniques and the like. Other types of construction techniques may be used herein.

Figure 6:
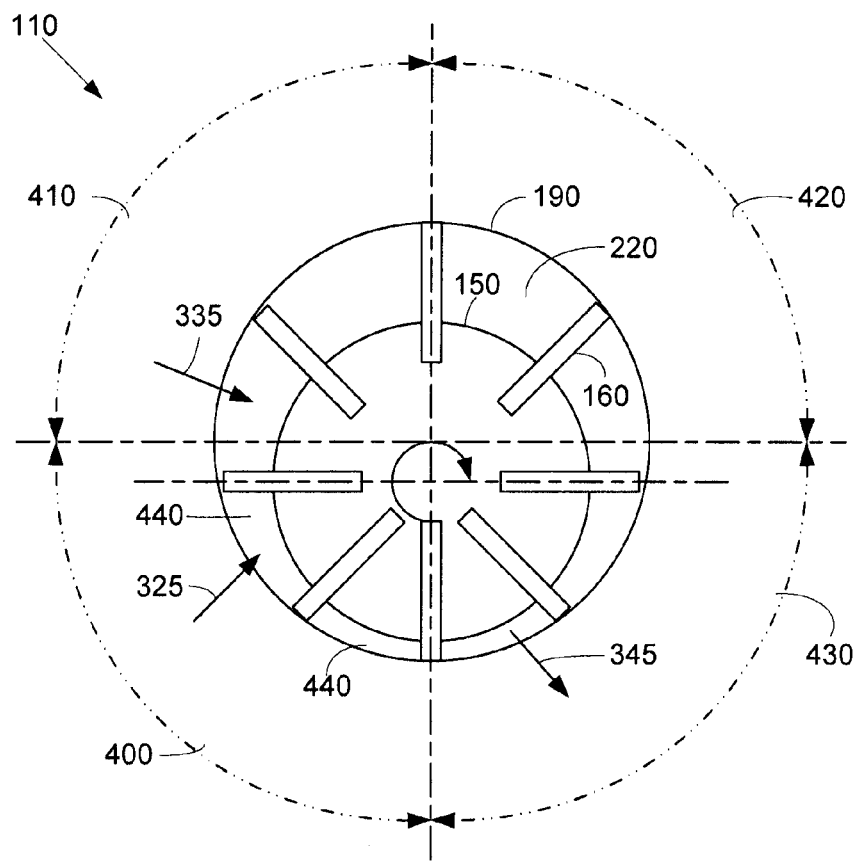
FIG. 6 is a schematic diagram showing the operation of the rotary carbonator of FIG. 2.

As is shown in FIG. 6, the off-center carbonator chamber 200 may be divided into a number of quadrants of differing sizes and shapes. By way of example, a first quadrant 400 may include the water inlet 325, a second quadrant 410 may include the gas inlet 335, a third quadrant 420 may be enclosed, and a fourth quadrant 430 may include the carbonated water outlet 345. The positioning of the inlets and the outlet in the quadrants may vary. The vanes 160, in turn, may divide the quadrants into a number of vane cavities 440.

In use, the vane cavities 440 in the first quadrant 400 and the second quadrant 410 become progressively larger in area. As the vane cavities 440 become larger in area, a negative pressure may be created that draws the flow of water 30 through the water inlet 325 in the first quadrant 400. Likewise, the vane cavities 440 in the second quadrant 410 also continue to get progressively larger in area. The flow of carbon dioxide 50 enters the second quadrant 410 via the gas inlet 335. The volume of the carbon dioxide 50 injected into the vane cavities 440 of the second quadrant 410 may be substantially equal to the volume of the vane cavities 440 in the second quadrant 410 minus the volume of the vane cavities 440 in the first quadrant 400. The water 30 and the carbon dioxide 50 may begin to mix within the vane cavities 440 of the second quadrant 410.

As the rotor 150 continues to rotate, the water 30 and the carbon dioxide 50 pass into vane cavities 440 of the third quadrant 420. The vane cavities 440 of the third quadrant 420 and the fourth quadrant 430 become progressively smaller in area. Because the water 30 is incompressible and the carbon dioxide 50 can only compress to a given extent, the carbon dioxide 50 will be forced into a solution with the water 30 to create the carbonated water 60. The vane cavities 440 also promote turbulence therein which further promotes good mixing. By the time the carbonated water 60 exits the third quadrant 420, most of the carbon dioxide 50 may be dissolved into the water 30. The carbonated water 60 then progresses to the fourth quadrant 430. The vane cavities 440 of the fourth quadrant 430 continue to get progressively smaller in area. The fourth quadrant 430 may be in communication with the carbonated water outlet 345. The progressive reduction in the size of the vane cavities 440 in the fourth quadrant 430 provides a pumping action that forces the carbonated water 60 out of the carbonated water outlet 340. The carbonated water 60 may have about six (6) to about ten (10) volumes of carbon dioxide therein although the amount of carbonation may vary as desired.

The carbonated water 60 then may flow through the heat exchanger 65 and to the nozzle 70 where the carbonated water 60 may be mixed with the concentrates 90 and/or other ingredients to form the beverage 95. The rotational velocity of the rotor 150 may be used to control the volumetric flow rate therethrough so as to eliminate or reduce the need for a flow control device. The rotational velocity of the rotor 150 thus may be varied. Other components and other configurations also may be used herein.

Although the off-center carbonator chamber 200 has been defined in terms of the four quadrants described above, the carbonator chamber 200 may be divided into any number of sections with any number of the vane cavities 440 therein. The flow of water 30 and the flow of carbon dioxide 50 may be mixed in any order. Given such, the water inlet 325 may be positioned in the second quadrant 410 while the gas inlet 335 may be positioned in the first quadrant 400 or elsewhere. The inlets 325, 335 and the outlet 345 may be "point" ports. A point port may be a hole or an opening that allows a fluid to enter a chamber. The point ports also may span a larger portion of the carbonator chamber 200 or span multiple vane cavities 440. A larger opening may help to minimize a pressure drop thereacross. Multiple rotary carbonators 100 also may be used together, in parallel or in series (cascading).

As described above, the radius of curvature within each vane chamber 440 may vary. For example, in cavities or quadrants where compression or expansion occurs, the radius of curvature may increase or decrease. For example, a vane chamber 440 that causes compression may have a radius of curvature that decreases. A vane chamber 440 with a constant pressure may have a more constant or somewhat increasing radius of curvature.

The rotary carbonator 110 thus provides on demand carbonated water 60. The rotary carbonator 110 provides both increased drink quality overall and from pour to pour via the on demand production. Moreover, the rotary carbonator 110 may provide cost savings and space savings via the elimination of the carbonator tank 220 and the flow control device 80 and the like. Other components and other configurations may be used herein.

Figure 7:
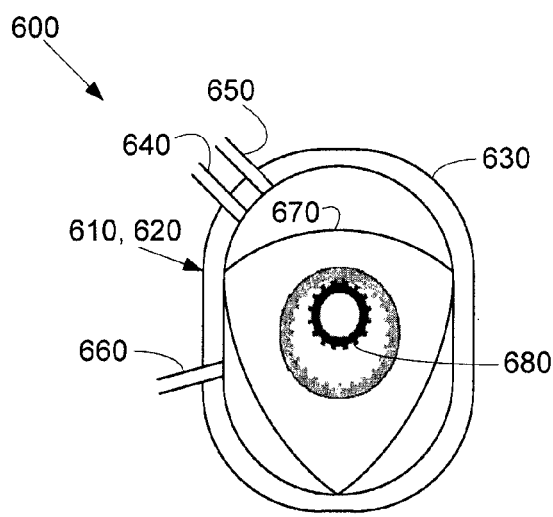
FIG. 7 is a schematic diagram of an alternative embodiment of a rotary carbonator as may be described herein.

FIG. 7 is a schematic diagram of an alternative embodiment of a rotary carbonator 600. Similar to that described above, the rotary carbonator 600 may be a type of a positive displacement pump 610 and the like. More particularly, the positive displacement pump 610 may be a Wankel engine like pump 620. The Wankel engine like pump 620 may include an oval shaped housing 630. The housing 630 may have any size, shape, or configuration. The oval shaped housing 630 may include a water inlet 640, a gas inlet 650, and a carbonated water outlet 660. The inlets 640, 650 and the outlet 660 may have varying positions. Additional inlet and outlets also may be used. Positioned within the housing 630 may be a three sided symmetric rotor 670. The three sided symmetric rotor 670 may have any size, shape, or configuration. The three sided symmetric rotor 670 may be engaged with an eccentric shaft 680 for rotation therewith. Other components and other configurations may be used herein.

In use, the flow of water 30 and the flow of carbon dioxide 50 pass through the inlets 640, 650. The flows 30, 50 may be compressed as the area between the housing 630 and the three sided symmetrical rotor 670 becomes increasingly smaller. After compression, the flow of carbonated water 60 thus may leave the housing 630 via the carbonated water outlets 660. Other components and other configurations may be used herein.

Figure 8:
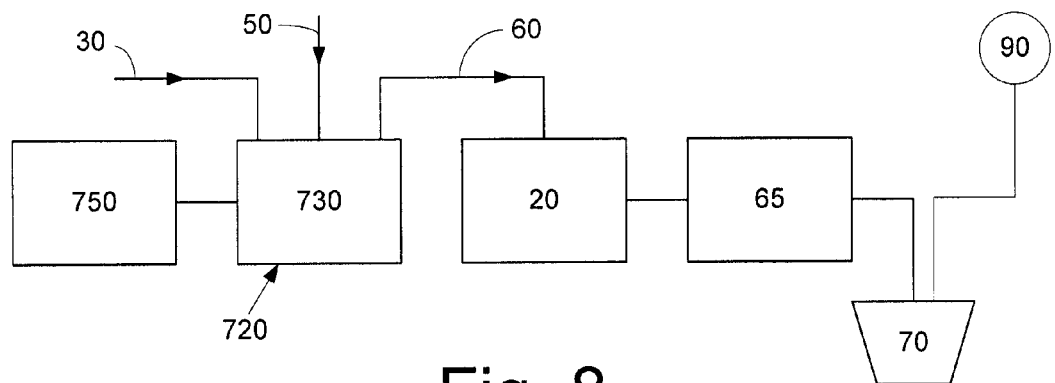
FIG. 8 is a schematic diagram of a beverage dispensing system with an alternative embodiment of a positive displacement pump in the form of a piston pump as may be described herein.
Figure 9:
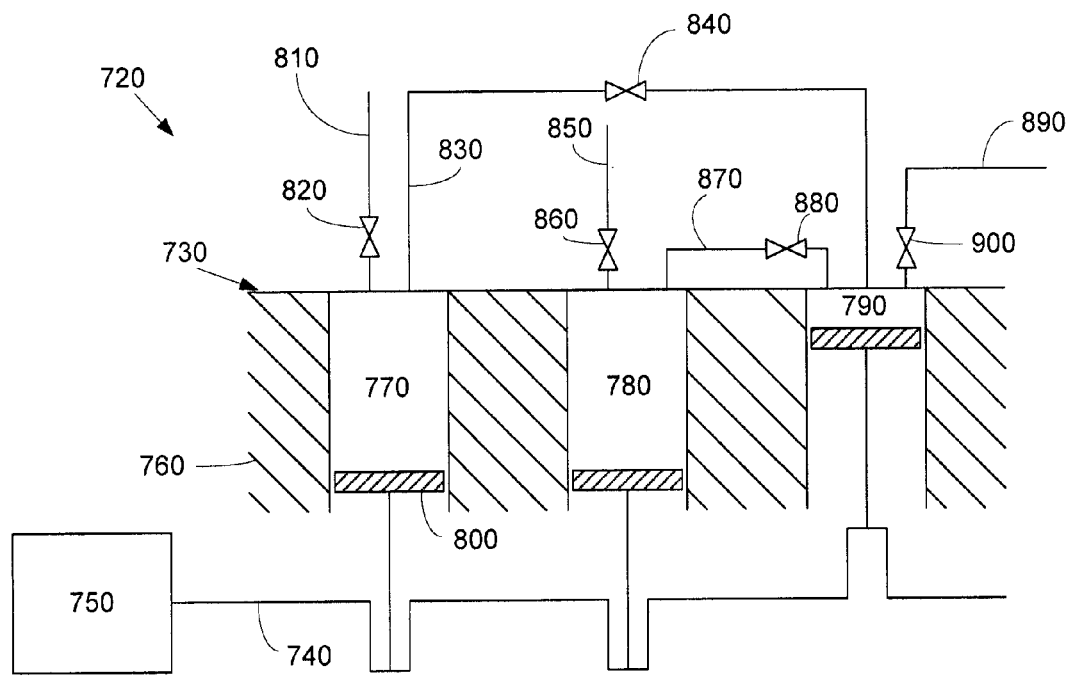
FIG. 9 is a schematic diagram of a portion of the positive displacement pump of FIG. 8.

FIG. 8 shows a schematic diagram of an alternative embodiment of a beverage dispensing system 700 as may be described herein. Instead of using the pump 40 and perhaps the flow control device 80 of FIG. 1, the beverage dispensing system 700 may use a further embodiment of a positive displacement pump 720. In this example, FIG. 9 shows an example of the positive displacement pump 720 as a type of a piston pump 730. The piston pump 730 may be in communication with the flow of plain water 30 and the flow of carbon dioxide 50 as described above.

The piston pump 730 may have any size, shape, or configuration. Generally described, the piston pump 730 may include a crankshaft 740. The crankshaft 740 may be driven by a drive motor 750. The drive motor 750 may be a conventional AC motor and the like. Other types of drive devices may be used herein. The piston pump 730 may include a block 760 with a number of cylinders 770 formed therein. In this example, a first cylinder 770, a second cylinder 780, and a third cylinder 790 may be used. Any number of cylinders may be used herein. Each cylinder may have a piston 800 therein driven by the crankshaft 740. The first cylinder 770 may be a water cylinder in communication with a water inlet line 810 with a water inlet valve 820. The first cylinder 770 also may be in communication with a water outlet line 830 with a water outlet valve 840. The water outlet line 830 may be in communication with the third cylinder 790. The second cylinder 780 may be a carbon dioxide cylinder in communication with a gas inlet line 850 with a gas inlet valve 860. The second cylinder 780 also may be in communication with a gas outlet line 870 with a gas outlet valve 880. The gas outlet line 870 also may be in communication with the third cylinder 790. The third cylinder 790 may be a mixing cylinder and may be in communication with the water outlet line 830 and the gas outlet line 870. The third cylinder 790 also may have a carbonated water outlet line 890 with a carbonated water outlet valve 900 thereon. The cylinders may have varying sizes. Other components and other configurations may be used herein.

In use, the water inlet valve 820 and the gas inlet valve 860 may be used to meter the incoming flows of water 30 and carbon dioxide 50 into the first cylinder 770 and the second cylinder 780. The water outlet valve 840 and the gas outlet valve 880 also may be used to meter the flow of water 30 and carbon dioxide 50 from the first cylinder 770 and the second cylinder 780 to the third cylinder 790. The drive motor 750 thus drives the crankshaft 740 so as to cause the pistons 800 to reciprocate. The down-stroke of the pistons 800 in the first cylinder 770 and the second cylinder 780 may allow a portion of the flows of water 30 and carbon dioxide 50 to enter therein. During the upstroke of the pistons 800, the pistons 800 may force the metered portions of the water 30 and the carbon dioxide 50 into the third cylinder 790 so as to mix and form the carbonated water 60 therein.

The carbonated water 60 then may flow to the carbonator tank 20 until a beverage is dispensed. The pressure inside the carbonator tank 20 may be lower as compared to a standard tank. A standard tank generally uses the higher pressure to force the carbon dioxide into solution. Instead, the piston 800 in the third cylinder 790 forces the carbon dioxide into solution. The carbonator tank 20 thus may act as a holding tank with sufficient pressure to keep the carbon dioxide in solution.

The use of the various valves also may allow for control of the amount of carbon dioxide in solution. For example, the flows of water 30 and carbon dioxide 50 may only enter the first cylinder 770 and the second cylinder 780 on every other down-stroke so as to allow compression in the third cylinder 790 twice. This multiple compression may allow for more carbon dioxide to be forced into solution. Moreover, the extra compression may help stabilize the solution so as to minimize escape of the carbon dioxide.

The piston pump 730 as the positive displacement pump 720 of the beverage dispensing system 700 thus provides on demand carbonated water 60. The piston pump 730 provides both increased drink quality overall and from pour to pour via the on demand production. Moreover, the piston pump 730 may provide cost saving and space savings through the use of a smaller carbonator tank 20 and the elimination of flow control devices and the like.

In addition to the examples of the positive displacement pump described herein, other types also may be used herein. For example, the positive displacement pump may take the form of a gear pump, a screw pump, a plunger pump, and the like. Any type of pump where water and carbon dioxide may be compressed and forced into solution before being discharged may be used herein. Combinations of different pumps also may be used herein together. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A rotary carbonator for use with a beverage dispensing system, comprising:
    an off-center carbonator chamber;
    a rotor positioned within the off-center carbonator chamber;
    a plurality of vanes extending from the rotor;
    the plurality of vanes defining within the off-center carbonator chamber a first plurality of vane cavities with an increasing area and a second plurality of vane cavities with a decreasing area;
    a water inlet and a gas inlet positioned about the first plurality of vane cavities; and
    a carbonated water outlet positioned about the second plurality of vane cavities.

2. The rotary carbonator of claim 1, further comprising a drive motor.

3. The rotary carbonator of claim 2, further comprising a magnetic coupling positioned about the drive motor.

4. The rotary carbonator of claim 1, wherein the plurality of vanes comprises a plurality of opposed pairs and wherein the plurality of opposed pairs comprises a spring therebetween.

5. The rotary carbonator of claim 1, further comprising a stator and wherein the rotor and the stator define the off-center carbonator chamber.

6. The rotary carbonator of claim 5, wherein an interior surface of the stator comprises a plurality of radii of curvature.

7. The rotary carbonator of claim 5, wherein an exterior of the stator comprises a stator water pathway of the water inlet, a stator gas pathway of the gas inlet, and a stator carbonated water pathway of the carbonated water outlet.

8. The rotary carbonator of claim 1, wherein the off-center carbonator chamber comprises a rear chamber plate and a front chamber plate.

9. The rotary carbonator of claim 8, wherein the rear chamber plate and the front chamber plate comprise a plate water pathway of the water inlet, a plate gas pathway of the gas inlet, and a plate carbonated water pathway of the carbonated water outlet.

10. The rotary carbonator of claim 1, further comprising a pump housing surrounding the off-center carbonator chamber.

11. The rotary carbonator of claim 10, wherein the pump housing comprises a housing water pathway of the water inlet, a housing gas pathway of the gas inlet, and a housing carbonated water pathway of the carbonated water outlet.

12. The rotary carbonator of claim 10, wherein the pump housing comprises a housing plate.

13. The rotary carbonator of claim 1, wherein the first plurality of vane cavities comprises a first quadrant with the water inlet and a second quadrant with the gas inlet.

14. The rotary carbonator of claim 13, wherein the second plurality of vane cavities comprises a third quadrant and a fourth quadrant with the carbonated water outlet.

15. A method of carbonating water on demand, comprising:
    rotating a plurality of sliding vanes in an off-center carbonator chamber;
    wherein the plurality of sliding vanes defines a first plurality of vane cavities with an increasing area and a second plurality of vane cavities with a decreasing area;
    flowing water into the first plurality of vane cavities;
    flowing carbon dioxide into the first plurality of vane cavities;
    mixing the water and the carbon dioxide in the second plurality of vane cavities; and
    flowing carbonated water out of the second plurality of vane cavities.

* * * * *